US011080207B2

(12) United States Patent
Sen Sarma et al.

(10) Patent No.: US 11,080,207 B2
(45) Date of Patent: Aug. 3, 2021

(54) CACHING FRAMEWORK FOR BIG-DATA ENGINES IN THE CLOUD

(71) Applicant: QUBOLE INC, Santa Clara, VA (US)

(72) Inventors: Joydeep Sen Sarma, Bangalore (IN); Rajat Venkatesh, Bengaluru (IN); Shubham Tagra, Bangalore (IN)

(73) Assignee: Qubole, Inc., Mountain View, CA (US)

( * ) Notice: Subject to any disclaimer, the term of this patent is extended or adjusted under 35 U.S.C. 154(b) by 0 days.

(21) Appl. No.: 15/616,186

(22) Filed: Jun. 7, 2017

(65) Prior Publication Data

US 2017/0351620 A1 Dec. 7, 2017

Related U.S. Application Data

(60) Provisional application No. 62/346,627, filed on Jun. 7, 2016.

(51) Int. Cl.
*G06F 12/128* (2016.01)
*G06F 12/0813* (2016.01)
(Continued)

(52) U.S. Cl.
CPC ........ *G06F 12/128* (2013.01); *G06F 12/0813* (2013.01); *G06F 12/0868* (2013.01);
(Continued)

(58) Field of Classification Search
CPC ............. G06F 12/0813; G06F 12/0868; G06F 12/0871; G06F 12/128; G06F 2212/1032;
(Continued)

(56) References Cited

U.S. PATENT DOCUMENTS

| 5,603,001 A | 2/1997 | Sukegawa et al. |
| 5,907,675 A | 5/1999 | Aahlad |

(Continued)

OTHER PUBLICATIONS

International Search Report for PCT/US2015/045419 completed Oct. 2, 2015; 2 pages.

(Continued)

*Primary Examiner* — Larry T MacKall
(74) *Attorney, Agent, or Firm* — Landmark Intellectual Property Law, PLLC; Gregory Murphy

(57) ABSTRACT

The present invention is generally directed to a caching framework that provides a common abstraction across one or more big data engines, comprising a cache filesystem including a cache filesystem interface used by applications to access cloud storage through a cache subsystem, the cache filesystem interface in communication with a big data engine extension and a cache manager; the big data engine extension, providing cluster information to the cache filesystem and working with the cache filesystem interface to determine which nodes cache which part of a file; and a cache manager for maintaining metadata about the cache, the metadata comprising the status of blocks for each file. The invention may provide common abstraction across big data engines that does not require changes to the setup of infrastructure or user workloads, allows sharing of cached data and caching only the parts of files that are required, can process columnar format.

10 Claims, 2 Drawing Sheets

(51) Int. Cl.
*G06F 12/0871* (2016.01)
*G06F 12/0868* (2016.01)

(52) U.S. Cl.
CPC .. *G06F 12/0871* (2013.01); *G06F 2212/1032* (2013.01); *G06F 2212/1041* (2013.01); *G06F 2212/466* (2013.01); *G06F 2212/604* (2013.01); *G06F 2212/621* (2013.01)

(58) Field of Classification Search
CPC ....... G06F 2212/1041; G06F 2212/466; G06F 2212/604; G06F 2212/621
See application file for complete search history.

(56) References Cited

U.S. PATENT DOCUMENTS

| | | | |
|---|---|---|---|
| 6,192,391 B1 | 2/2001 | Ohtani | |
| 6,460,027 B1 | 10/2002 | Cochrane et al. | |
| 6,601,062 B1 | 7/2003 | Deshpande et al. | |
| 6,847,962 B1 | 1/2005 | Cochrane et al. | |
| 7,680,994 B2 | 3/2010 | Buah et al. | |
| 7,844,853 B2 | 11/2010 | Barsness et al. | |
| 7,848,261 B2 | 12/2010 | Fachan | |
| 8,260,840 B1 | 9/2012 | Sirota et al. | |
| 8,296,419 B1 | 10/2012 | Khanna et al. | |
| 8,996,482 B1 | 3/2015 | Singh et al. | |
| 9,049,746 B2 | 6/2015 | Periyalwar et al. | |
| 9,451,013 B1 | 9/2016 | Roth et al. | |
| 9,483,785 B1 | 11/2016 | Corley et al. | |
| 9,531,607 B1 | 12/2016 | Pai et al. | |
| 9,571,561 B2 | 2/2017 | Jang | |
| 9,645,859 B1 | 5/2017 | Dash et al. | |
| 9,860,569 B1 | 1/2018 | Wilms et al. | |
| 10,069,693 B1 | 9/2018 | Daptardar et al. | |
| 2002/0145983 A1 | 10/2002 | Block et al. | |
| 2002/0157113 A1 | 10/2002 | Allegrezza | |
| 2003/0005350 A1 | 1/2003 | Koning et al. | |
| 2003/0065874 A1 | 4/2003 | Marron et al. | |
| 2004/0193626 A1 | 9/2004 | Colby et al. | |
| 2005/0222996 A1 | 10/2005 | Yalamanchi | |
| 2005/0278387 A1 | 12/2005 | Kamada et al. | |
| 2007/0094290 A1* | 4/2007 | Oka | G11B 20/10 |
| 2007/0195810 A1 | 8/2007 | Fachan | |
| 2007/0294493 A1 | 12/2007 | Buah et al. | |
| 2008/0141065 A1 | 6/2008 | Okabe | |
| 2009/0043873 A1 | 2/2009 | Barsness et al. | |
| 2009/0182779 A1 | 7/2009 | Johnson | |
| 2009/0222418 A1 | 9/2009 | Layman | |
| 2009/0327854 A1 | 12/2009 | Chhajer et al. | |
| 2010/0153482 A1 | 6/2010 | Kim et al. | |
| 2010/0306286 A1 | 12/2010 | Chiu et al. | |
| 2011/0119449 A1 | 5/2011 | Neerincx et al. | |
| 2011/0167221 A1 | 7/2011 | Pangal et al. | |
| 2011/0314485 A1 | 12/2011 | Abed | |
| 2012/0047339 A1 | 2/2012 | Decasper et al. | |
| 2012/0102291 A1 | 4/2012 | Cherian et al. | |
| 2012/0151272 A1 | 6/2012 | Behrendt et al. | |
| 2012/0215763 A1 | 8/2012 | Hughes et al. | |
| 2012/0304192 A1 | 11/2012 | Grove et al. | |
| 2013/0110764 A1 | 5/2013 | Wilf | |
| 2013/0124483 A1 | 5/2013 | Furuhashi et al. | |
| 2013/0132967 A1* | 5/2013 | Soundararajan | G06F 9/5066 718/104 |
| 2013/0179881 A1 | 7/2013 | Calder et al. | |
| 2013/0189969 A1 | 7/2013 | Periyalwar et al. | |
| 2013/0204948 A1 | 8/2013 | Zeyliger et al. | |
| 2013/0227558 A1 | 8/2013 | Du et al. | |
| 2013/0232254 A1 | 9/2013 | Srikanth et al. | |
| 2013/0254171 A1 | 9/2013 | Grondin et al. | |
| 2013/0290771 A1 | 10/2013 | Kim et al. | |
| 2013/0318379 A1 | 11/2013 | Seshadri et al. | |
| 2013/0332612 A1 | 12/2013 | Cai et al. | |
| 2014/0040575 A1 | 2/2014 | Horn | |
| 2014/0059306 A1 | 2/2014 | Bender et al. | |
| 2014/0059552 A1 | 2/2014 | Cunningham et al. | |
| 2014/0067992 A1* | 3/2014 | Saeki | H04L 29/08549 709/214 |
| 2014/0095505 A1 | 4/2014 | Blanchflower et al. | |
| 2014/0149590 A1 | 5/2014 | Mallipeddi et al. | |
| 2014/0156777 A1* | 6/2014 | Subbiah | H04L 67/1097 709/213 |
| 2014/0189109 A1 | 7/2014 | Jang | |
| 2014/0195558 A1 | 7/2014 | Murthy et al. | |
| 2014/0279838 A1 | 9/2014 | Tsirogiannis et al. | |
| 2015/0222705 A1* | 8/2015 | Stephens | G06F 3/0611 709/214 |
| 2015/0234688 A1* | 8/2015 | Dageville | G06F 16/27 718/105 |
| 2015/0242197 A1 | 8/2015 | Alfonso et al. | |
| 2015/0379026 A1 | 12/2015 | Todd et al. | |
| 2016/0065627 A1 | 3/2016 | Pearl et al. | |
| 2016/0078088 A1* | 3/2016 | Venkatesh | G06F 16/24539 707/713 |
| 2016/0179581 A1* | 6/2016 | Soundararajan | G06F 9/5033 718/104 |
| 2016/0224638 A1 | 8/2016 | Bestler et al. | |
| 2016/0350371 A1 | 12/2016 | Das et al. | |
| 2016/0371193 A1* | 12/2016 | Floratou | G06F 12/0891 |
| 2017/0220403 A1* | 8/2017 | Maag | G06F 11/3692 |
| 2017/0337138 A1 | 11/2017 | Li et al. | |
| 2018/0159727 A1 | 6/2018 | Liu et al. | |

OTHER PUBLICATIONS

International Search Report for PCT/US2015/050174 completed Nov. 16, 2015; 2 pages.
International Search Report for PCT/US2015/057003 completed Dec. 13, 2015; 2 pages.

* cited by examiner

CACHING FRAMEWORK FOR BIG-DATA ENGINES IN THE CLOUD

RELATED APPLICATIONS

The present application claims priority to U.S. Provisional Patent Application No. 62/346,627, filed on Jun. 7, 2016, which is incorporated herein by reference in its entirety.

BACKGROUND

Cloud Stores are generally gaining popularity as desirable locations for data lakes for big data workloads. With their cost efficiency and virtually unlimited storage capacity, more and more users are moving data from on premise storage such as but not limited to Hadoop Distributed File Systems (HDFS), into these stores. While a key advantage of big data technology is the ability to collect and store large volumes of structured, unstructured and raw data in a data lake, most organizations only end up processing a small percentage of the data they gather. According to recent research from Forrester, an estimated 60-73% of data that businesses store ends up not being processed. Given this statistic, deployments that tie compute and storage together end up spending on compute capacity that is underutilized.

In addition, big data workloads are often "bursty", requiring data teams to provision their resources to peak capacity at all times, resulting once again in resource underutilization during longer lasting off-peak usage hours. Many modern big data analytics technologies such as Apache Spark, are designed for in-memory processing, so they're even more compute intensive.

While mass data storage is becoming increasingly cheap, compute is expensive and ephemeral. By separating compute and storage, data teams can easily and economically scale storage capacity to match rapidly growing datasets while only scaling distributed computation as required by their big data processing needs.

However, unlike HDFS where storage lives close to compute, workloads involving cloud stores (such as Amazon Simple Storage Service (S3)) have to deal with inevitable network latencies. With data and compute being distributed over network, it becomes more important to use caches to enable higher performance. This need has become stronger as newer-generation engines become more CPU efficient. In-memory models like Spark's RDD are a powerful solution but require manual setup.

Accordingly, it is desirable to provide a file caching framework that provides a common abstraction across various Big Data engines (such as but not limited to MapReduce, Spark, Presto, Hive, Tez, and/or any other engine that may use data parallel processing to perform SQL and other forms of analysis in a fast and scalable manner over large volumes of data). Such a framework may automatically accelerate performance. It is also desirable for such a caching framework to require no user intervention during runtime, need no changes to existing setups of various pieces of infrastructure and/or user workloads, allow sharing of cached data across engines and intelligently cache only the parts of files that are required, and/or handle columnar format efficiently.

SUMMARY OF THE INVENTION

Aspects in accordance with some embodiments of the present invention may include a caching framework that provides a common abstraction across one or more big data engines, comprising a cache filesystem comprising: a cache filesystem interface, used by applications to access cloud storage through a cache subsystem, the cache filesystem interface in communication with a big data engine extension and a cache manager; the big data engine extension, providing cluster information to the cache filesystem and working with the cache filesystem interface to determine which nodes cache which part of a file; and a cache manager, responsible for maintaining metadata about the cache, the metadata comprising the status of blocks for each file.

Aspects in accordance with some embodiments of the present invention may include a method of caching data across one or more big data engines in response to a task, utilizing an application running on a node in communication with a cache manager on the node, a local disk on the node, and cloud storage, the method comprising: reading by the application a file with byte range [x,y] from a cache, the file with byte range [x,y] received from the local disk; requesting by the application block status from the cache manager; receiving at the application from the cache manager blocks for byte range [x,y] on local disk; reading by the application the file [x,y] from the local disk; writing, by the application, the file with byte range [y,z] to local disk; updating the cache status in the cache manager by the application.

Other aspects in accordance with some embodiments of the present invention may include a method of caching data across one or more big data engines in response to a task, utilizing an application running on a node in communication with a cache manager on the node, a local disk on the node, and cloud storage, the method comprising: reading by the application a file with byte range [x,y] from a cache, the file with byte range [x,y] received from the local disk; requesting by the application block status from the cache manager; receiving at the application from the cache manager blocks for byte range [x,y] on local disk; reading by the application the file [x,y] from the local disk; providing by the application the file with byte range [y,z] from the cloud storage when not present on the local disk; writing, by the application, the file with byte range [y,z] to local disk; updating the cache status in the cache manager by the application.

Other aspects in accordance with some embodiments of the present invention may include a method of caching data across one or more big data engines in response to a task, utilizing an application running on a node, the application comprising a cache filesystem interface and a Hadoop filesystem, the application in communication with a cache manager on the node, a local disk on the node, and cloud storage, the method comprising: reading by the application a file with byte range [x,y] from a cache, the file with byte range [x,y] received from the local disk; requesting by the cache filesystem interface block status from the cache manager; receiving at the cache filesystem interface from the cache manager blocks for byte range [x,y] on local disk; reading by the cache filesystem interface the file [x,y] from the local disk.

Other aspects in accordance with some embodiments of the present invention may include a caching framework that provides common abstraction across one or more big data engines that does not require changes to the setup of infrastructure or user workloads, allows sharing of cached data and caching only the parts of files that are required, can process columnar format.

These and other aspects will become apparent from the following description of the invention taken in conjunction with the following drawings, although variations and modifications may be effected without departing from the spirit and scope of the novel concepts of the invention.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Unless otherwise indicated, the terms used in this document should be read in accordance with common usage.

In accordance with some embodiments of the present invention, attributes or aspects of the caching framework may include: (i) requiring no user intervention during runtime; (ii) may not require any change in existing setup of various pieces of infrastructure and user workloads; (iii) may allow sharing of the cached data across engines and intelligently caching only the parts of files that are required or desired; and/or (iv) handle columnar format efficiently.

In accordance with some embodiments of the present invention, the invention framework may implement the Hadoop FileSystem interface, which may allow it to transparently hook into various Big Data engines. Further, it may allow such interaction with various Big Data engines while exploiting each engine's scheduler to schedule tasks local to where the data is cached. Consistent Hashing may be used to decide placement of cache data across nodes (and the same may be used for task scheduling), which may reduce the impact of cache rebalancing when the membership of the cluster changes. To accommodate columnar storage layout, the framework may divide each file into logical blocks, and reads happen at a unit of these blocks. When a block is read from cloud store, it may also be cached on the local disk. This division of file into blocks may allow the framework to achieve faster warmup times by caching only the required (or otherwise desired) data. This division may also allow systems and methods in accordance with some embodiments of the present invention to handle columnar data more efficiently (in case only a subset of the columns are ever read/needed only the blocks corresponding to that are cached).

Metadata about or associated with these blocks may be maintained separately, indicating if the block is present in cache. Moreover, systems and method may comprise a lightweight server that may make this metadata available to the consumers. Keeping the metadata server independent of engine may allow sharing of the cache across various engines. The cached data may be stored on local disks and OS pagecache may be leveraged to provide in memory performance whenever possible.

Figure 1:
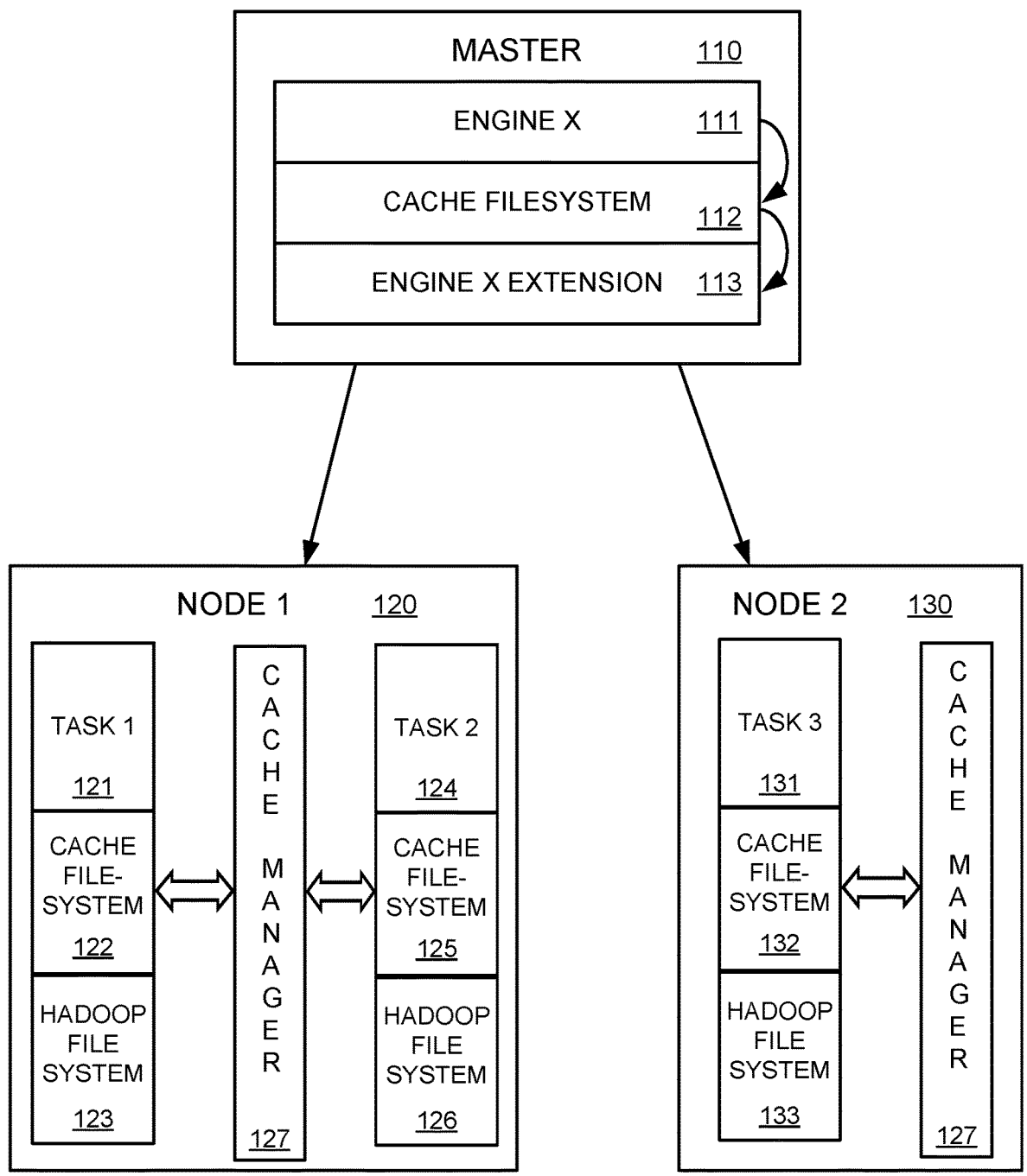
FIG. 1 illustrates an exemplary system in accordance with some embodiments of the present invention, comprising at least a Cache FileSystem Interface, Extension for engines, and Cache Manager.

With reference to FIG. 1, in accordance with some embodiments of the present invention, a system may be seen as a master 110 with at least one node 120. Master 110 may comprise Engine X 111, Cache FileSystem 112, and Engine X Extension 113. Note that Engine X is designated as "X" because the present invention may be used with different Big Data Engines, including but not limited to MapReduce, Spark, Presto, Hive, Tez, and/or any other engine that may use data parallel processing to perform SQL and other forms of analysis in a fast and scalable manner over large volumes of data. Note that while FIG. 1 shows a Hadoop FileSystem being used, this should not be seen as limiting the present invention to a Hadoop environment.

In general, there may be three main parts of this framework: (1) Cache FileSystem Interface; (2) Extension for engines; and (3) Cache Manager. FIG. 1 below show how cache fits in the cluster running an engine 'EngineX' where master node may be only concerned about scheduling while other nodes take care of execution.

Cache FileSystem Interface.

Systems and methods in accordance with some embodiments of the present invention may comprise a Cache FileSystem Interface 112, which may be provided to be used by applications to access cloud storage through the cache subsystem. The Cache FileSystem Interface 112 may implement the Hadoop FileSystem interface so the mechanism by which application accesses cloud storage does not change. In order to use this interface to access the cloud store, the Cache FileSystem Interface 112 may require configuration changes in the engine. On master nodes the Cache FileSystem Interface 112 may use the extension for engine 113, described next, to allocate splits of file. On worker nodes, it may use Cache Manager 127, described later, to read or obtain information about cache, in order to decide what part of read request may be served from cache and what may be read from cloud store. The Cache FileSystem Interface 112 may then read required data from cloud store, store a copy in cache and update Cache Manager 127 with new status of cache.

Extension for Engine.

Extension for Engine (or as shown in FIG. 1, "Engine X Extension" 113) may be part of framework is contained within the Cache FileSystem 112. It may provide cluster information to Cache FileSystem 112 which may help the Cache FileSystem 112 decide which node caches may be part of which files. Cache FileSystem 112 may utilize Consistent Hashing, as this may reduce any impact of rebalancing cache when a node may join or leave a cluster. This information may be later used by the engine's scheduler to schedule tasks (121, 124, 131) local to where data is cached. Each engine 111 may have a different way to obtain information about the cluster, and accordingly engine specific extensions 113 may be required. The Cache FileSystem 112 may provide to the engine X extension 113 a map of the block nodes assigned (<Block:Node>).

Hadoop FileSystem.

In FIG. 1, in both Node 1 and Node 2 Hadoop FileSystem components may be seen 123, 126, 133. In general, this represents any existing Hadoop FileSystem for the cloud storage that the Big Data engines already use. Caching Framework 100 may utilize the Hadoop FileSystem 123, 126, 133 to make the read requests to the cloud storage when it does not find requested or expected data in cache.

The system may be extendible to take sources other than Hadoop File System, such as but not limited to a Query output or task output. The query engine may identify which sub-query from the query is a candidate to be cached, for example based on usage patterns or some other heuristics, and may create a new table over the result of that sub-query backed via this caching framework. Populating the result of the sub-query into this table may be done via QueryOutput interface which may use the CachingFileSystem to write down the data locally on the nodes within the cluster. Along with this, file locations for this table may be stored in the metadata of the table or optionally in a central daemon which may be the repository of table to file locations mapping. Query engine from then onwards may use this table to prevent re-computation of the sub-query when it reoccurs in subsequent queries by reading cached data from the framework.

Cache Manager.

With continued reference to FIG. 1, Cache Manager 127 may be responsible for maintaining metadata about cache. The Cache Manager 127 may provide interfaces for the Cache FileSystem 112 instances to retrieve metadata of a file. For example, Cache Manager 112 may maintain metadata comprising the status of blocks for each file, handle cache eviction. The Cache Manager 127 may be configured with different eviction policies, such as but not limited to "Least Recently Used First" or "Least Frequently Used First" and may be configured, for example, with time based eviction or disk usage based eviction.

In accordance with some embodiments of the present invention, Cache Manager 127 may also be responsible for pinning certain files or parts of a file to the cache so that evictions may not remove such files or parts of a file. Policies for pinning may be provided by a user or a plugin for different file formats, and may be used to automatically decide—a decision which may be based at least in part on the format, which parts of a file may be important, and may pin such parts to the cache. Parts of a file may be, for example, headers or footers that may contain metadata.

Since the present invention may be used with SQL systems such as Hive, Presto and Spark SQL a new daemon, termed Sql Object Mapper, may be used that provides mapping between SQL objects such as Tables, Partitions, etc and Cache Manager Metadata. This may help bring down operational complexity by providing users with an ability to provide configuration in terms of user visible constructs. For example, rather than providing a pinning policy for files, users may mark a particular table as a "hot table" and Cache Manager may hold on to the cached data longer for that files related to that table.

There may be a single instance of Cache Manager 127 running in a node and all instances of Cache FileSystem 112 in that node may communicate with Cache Manager 127 to retrieve and update the metadata of the blocks. This may allow multiple applications and/or Big Data engines 111 to share the cache. Cache Manager 127 may ensure that only one copy of a block may be written to the cache in a concurrent environment, which may therefore minimize the impact of warm-up when multiple instances of Cache FileSystem 112 try to access the same un-cached block at the same time.

Figure 2:
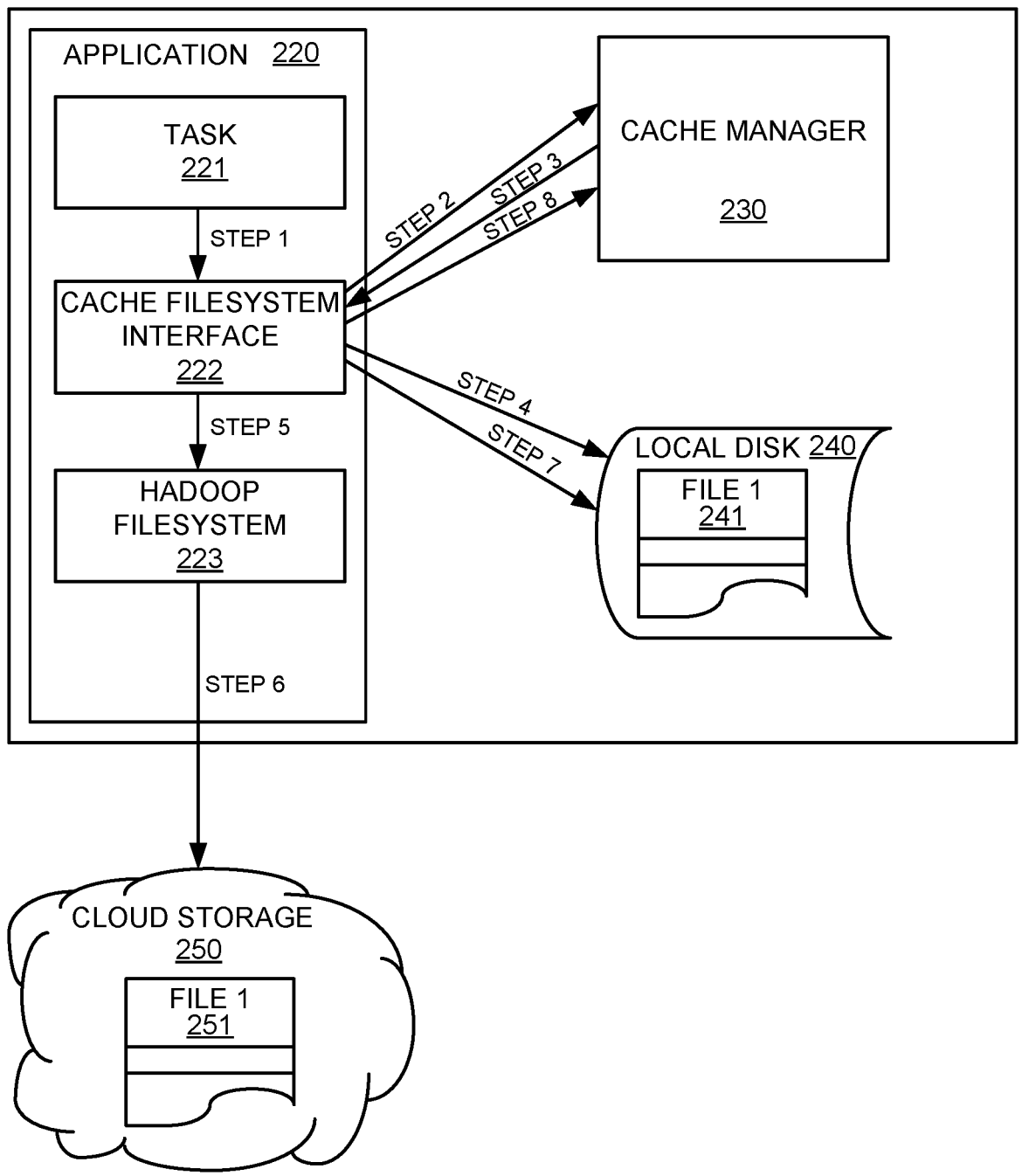
FIG. 2 illustrates exemplary workings of the Cache in a worker node, in accordance with some embodiments of the present invention.

FIG. 2 illustrates exemplary workings of the Cache in a worker node in accordance with some embodiments of the present invention. Note that the same or similar steps may occur in all worker nodes. Moreover, there may be multiple applications running inside the same node using Cache Manager for shared access to the cache.

In general, FIG. 2 depicts a multi-step process outlining the workings of the Cache in a worker node. Please note that these steps are provided in an attempt to clarify the functionality of the worker node cache. These steps are not required, and steps may be omitted or added, and the order of the steps may be changed, without deviating from the scope of the invention.

Before the process begins, a file and byte-range [x,y] 241 may be provided and stored within the local disk 240 and already be located in the cache. When a task 221 is assigned at step 1, file 1, byte-range [x,y] may be read from the Cache FileSystem Interface 222. At step 2, Block Status may be requested from the Cache Manager 230. Block status for byte-range [x,y] on disk may be provided back to the Cache FileSystem Interface 222 from Cachce Manager 230 in step 3. The Cache FileSystem Interface 222 may then read File 1, byte-range [x,y] 241 from the Local Disk 240 at step 4. At step 5 the Cache FileSystem Interface 222 may read File 1 byte-range [y,z] from the Hadoop File System 223. At step 6, the File 1, byte-range [y,z] may be read from cloud storage 250 and stored as File 1, byte-range [y,z] 251.

At this point, in step 7 the Cache FileSystem 222 may write File 1, byte range [y,z] to the local disk 240, and may at step 8 update the Cache Manager 230 with the current status.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A caching framework for storing metadata independent of a specific big data engine, the caching framework providing a common abstraction to share cached data across multiple big data engines, comprising a cache filesystem stored in a non-transitory computer readable storage medium comprising:

a cache filesystem interface, used by applications to access cloud storage through a cache subsystem, the cache filesystem interface in communication with a big data engine extension and a cache manager;

the big data engine extension, providing cluster information to the cache filesystem and working with the cache filesystem interface to determine which nodes cache which part of a file; and a cache manager, responsible for maintaining metadata about the cache, the metadata comprising the status of blocks for each file and stored separately from the block and configured to ensure that only one copy of a block is written to the cache.

2. The caching framework of claim 1, wherein determining which nodes cache with part of a file by the cache filesystem is performed using consistent hashing to reduce the impact of rebalance the cache when a node joins or leaves the cluster.

3. The caching framework of claim 1, wherein the cache manager executes cache eviction.

4. The caching framework of claim 3, wherein cache eviction is configured based upon eviction policies, eviction policies selected from the group consisting of Least Recently Used First, or Least Frequently Used First, time-based eviction, and disk usage-based eviction.

5. The caching framework of claim 1, wherein the cache manager is further configured to pin certain files or parts of files to cache so that such files or parts of files cannot be evicted.

6. The caching framework of claim 5, wherein the cache manager comprises pinning policies provided by a user or a plugin which are used, at least in part, to determine which parts of a file are important and pin such parts to the cache.

7. The caching framework of claim 6, wherein the parts of a file that are important comprise headers and footers containing metadata.

8. The caching framework of claim 1, wherein the cache filesystem communicates with the cache manager to retrieve and update block metadata.

9. The caching framework of claim 8, wherein the cache manager ensures that only one copy of the block is written to the cache in a concurrent environment.

10. The caching framework of claim 1 wherein the multiple big data engines comprise at least two engines are selected from the group consisting of Map-Reduce, Spark, Presto, Hive, and Tez.

* * * * *